United States Patent
Brustoloni

(10) Patent No.: US 7,207,062 B2
(45) Date of Patent: Apr. 17, 2007

(54) METHOD AND APPARATUS FOR PROTECTING WEB SITES FROM DISTRIBUTED DENIAL-OF-SERVICE ATTACKS

(75) Inventor: Jose' C Brustoloni, Westfield, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 904 days.

(21) Appl. No.: 10/175,458

(22) Filed: Jun. 19, 2002

(65) Prior Publication Data

US 2003/0035370 A1    Feb. 20, 2003

Related U.S. Application Data

(60) Provisional application No. 60/313,031, filed on Aug. 16, 2001.

(51) Int. Cl.
*G06F 9/00* (2006.01)
*G06F 15/16* (2006.01)
*G06F 17/00* (2006.01)
*G06F 15/177* (2006.01)
*G06F 15/173* (2006.01)
*G06F 11/00* (2006.01)
*H04L 9/00* (2006.01)
*G08C 15/00* (2006.01)

(52) U.S. Cl. .............................. 726/13; 726/11; 726/12; 713/151; 713/152; 713/153; 713/154; 709/220; 709/221; 709/222; 709/223; 370/229; 370/230; 370/231; 370/232

(58) Field of Classification Search ............ 726/11–13; 713/151–154; 709/220–223; 370/229–232
See application file for complete search history.

(56) References Cited

U.S. PATENT DOCUMENTS 6,073,175 A * 6/2000 Tavs et al. .................. 709/226

(Continued)

OTHER PUBLICATIONS

RFC-2827 ("Network Ingress Filtering: Defeating Denial of Service Attacks which employ IP Source Address Sppofing") May 2000.*

(Continued)

*Primary Examiner*—Avaz Sheikh
*Assistant Examiner*—Longbit Chai
(74) *Attorney, Agent, or Firm*—Stephen M. Gurey

(57) ABSTRACT

An Internet Service Provider (ISP), in consideration of being remunerated in some manner by a site, determines whether packets destined to that site conform to a profile provided to the ISP by that site. The profile, indicates, for example, what protocols are allowed by the server, and, for each such protocol, what destination port numbers or message types are allowed, a maximum transmission rate, the maximum number of allowed connections a client may have, and whether to enforce congestion-avoidance. This server profile enforcement (SPE) automatically thwarts denial of service attacks from attackers that send packets to the subscribing server from that ISP using connections or having packet characteristics that do not conform to the acceptable characteristics specified in the profile. SPE is generally performed by an SPE unit, which can be incorporated in the access gateways of an ISP that supports the service. Packets may also be forwarded in multiple classes of service depending upon the type of traffic from which they originate. Multiple classes of service allow the method to be effective even if deployed only by select ISPs.

7 Claims, 5 Drawing Sheets

U.S. PATENT DOCUMENTS

| | | | |
|---|---|---|---|
| 6,119,235 A | 9/2000 | Vaid et al. | 713/201 |
| 6,167,445 A * | 12/2000 | Gai et al. | 709/223 |
| 6,459,682 B1 * | 10/2002 | Ellesson et al. | 370/235 |
| 6,738,377 B1 * | 5/2004 | Boden | 370/392 |

OTHER PUBLICATIONS

"Operating Firewalls outside the LAN perimeter" Robert N. Smith, Feb. 10-12, 1999.*

Robert N. Smith, et al, "Operating Firewalls Outside the LAN Perimeter", *1999 IEEE International Performance Computing & Communications Conference*, (Feb. 10, 1999), pp. 493-498, XP000859730.

Cisco Systems, "Securing the Network, Egress & Ingress Filtering" etc., *Cisco ISP Essentials*, (Jun. 6, 2001), pp. 63-95.

European Search Report.

Floyd, S. et al, "Promoting the Use of End-to-End Congestion Control in the Internet", IEEE/ACM Transactions on Networking, vol. 7, No. 4, Aug. 1999, XP-000848692, pp. 458-472.

A. Odlyzko, "Paris Metro Pricing for the Internet", Proc. ACM Conference on Electronic Commerce (EC99), ACM, 1999, pp. 140-147.

R. Braden, et al., "Integrated Services in the Internet Architecture: an Overview," IETF, RFC 1633, Jun. 1994.

S. Blake, et al., "An Architecture for Differentiated Services," IETF, RFC 2475, Dec. 1998.

P. Ferguson, et al., "Network Ingress Filtering: Defeating Denial of Service Attacks Which Employ IP Source Address Spoofing", IETF, RFC 2827 (also BCP 0038), May 2000.

S. Savage, et al., "Practical Network Support for IP Traceback", Proc. SIGCOMM'2000, pp. 295-306, ACM, Stockholm, Sweden, Aug. 2000.

J. Bruno, et al., "Retrofitting Quality of Service into a Time-Sharing Operating System", Proc. Annual Tech. Conf., USENIX, Jun. 1999, pp. 15-26.

"Characterizing and Tracing Packet Floods using Cisco Routers," Cisco, available at http://www.cisco.com/warp/public/707/22.html.

* cited by examiner

METHOD AND APPARATUS FOR PROTECTING WEB SITES FROM DISTRIBUTED DENIAL-OF-SERVICE ATTACKS

CROSS-REFERENCE TO RELATED APPLICATIONS

This application claims benefit of U.S. provisional application Ser. No. 60/313,031 filed Aug. 16, 2001, which is herein incorporated by reference.

This application is also related to co-pending and commonly assigned U.S. patent applications filed simultaneously herewith on Jun. 19, 2002 entitled: "METHOD AND APPARATUS FOR INCREMENTALLY DEPLOYING INGRESS FILTERING ON THE INTERNET", Ser. No. 10/175,577, and "METHOD AND APPARATUS FOR PROTECTING ELECTRONIC COMMERCE FROM DISTRIBUTED DENIAL-OF-SERVICE ATTACKS", Ser. No. 10/175,463.

TECHNICAL FIELD

This invention relates to communications over the Internet, and more particularly, to protecting servers on the Internet from malicious attacks that can partially or totally disrupt service.

BACKGROUND OF THE INVENTION

In a denial-of-service (DoS) attack, a malicious client (called the attacker) performs operations designed to partially or completely prevent legitimate clients from communicating with or gaining service from a server (called the victim). Denial of service attacks are common and cause significant losses. Well-known e-merchants, including Amazon, buy.com, E*Trade, and eBay, are among recent victims. Denial of service attacks can harm e-merchants in two ways. First, when an e-merchant cannot serve its customers, the e-merchant loses advertising and sales revenues. Second, the e-merchant's clients, advertisers, and investors are frustrated and may therefore seek competing alternatives.

Some denial of service attacks can be prevented by proper system administration. These include physical or remote takeover attacks and death-pill attacks. In a physical takeover attack, the attacker gains physical access to components of the Internet Service Provider (ISP) or e-merchant infrastructure (e.g., one or more links, routers, or servers) and compromises their functionality. In a remote takeover attack, the attacker exploits some bug in the infrastructure's software so as to gain privileged access and thus be able to modify the software remotely. In a death-pill attack the attacker sends one or a few packets to an infrastructure component (e.g., router or server) known to contain a bug, such that the packets cause the component to crash. Proper ISP and e-merchant physical security can eliminate physical takeover attacks. Likewise, prompt installation of patches or updates that fix software bugs can prevent future remote takeover or death-pill attacks exploiting those bugs.

On the contrary, congestive denial of service attacks cannot be similarly prevented. In a congestive attack, an attacker floods a server with so many packets that the server is unable to respond to requests sent by legitimate clients. Four factors make it difficult to defend against congestive attacks. First, any host connected to the Internet can be used to sustain a congestive attack against any victim also connected to the Internet. By design, the Internet will forward packets from any host to any other host on a best-effort basis, without bounding packet rate or volume. Second, there are many hosts (e.g., in homes and universities) that are connected to the Internet and do not have the benefit of proper system administration. Such hosts often contain bugs or are configured in such a way that attackers can, without authorization, use them as agents, i.e., as the hosts that actually send attack packets to a victim. Agents provide cloaking and leverage to an attacker, i.e., respectively, hide the attacker's identity and multiply the attacker's resources (e.g., bandwidth). Third, attackers can spoof attack packets, i.e., falsify the packets' source addresses. Spoofing is possible because the Internet does not validate source addresses. Spoofing further enhances an attacker's cloaking. Finally, automated tools of increasing sophistication for mounting denial of service attacks can be easily downloaded from the Web. Using such tools, even unskilled Web users can mount successful attacks.

The two currently most popular denial of service attack techniques, smurf and TCP SYN flooding, are both congestive. In a smurf attack, the attacker sends ICMP echo requests to a network's broadcast address. The attacker spoofs the requests with the victim's address. Therefore, each host in the network sends a reply not to the attacker but to the victim, thus unwittingly becoming an agent of the attack. In a TCP SYN flooding attack, the attacker or its agents send spoofed TCP SYN (i.e., connection request) packets to the victim. Each such bogus request causes the victim to tie up resources that could otherwise be used for requests from legitimate clients.

To prevent smurf attacks, the Internet Engineering Task Force (IETF) has changed the default treatment of directed broadcast packets by routers. Instead of accepting and forwarding directed broadcast packets, routers should now by default drop them. Additionally, to thwart spoofing, the IETF has recommended ingress filtering (see, e.g., P. Ferguson and D. Senie, "Network Ingress Filtering: Defeating Denial of Service Attacks Which Employ IP Source Address Spoofing," IETF, RFC 2827 (also BCP 0038), May 2000). With ingress filtering, ISP ingress routers should drop a packet that arrives in a port if the packet's source address does not match a prefix associated with the port. Ingress filtering automatically stops attacks that require spoofing. Moreover, if an attack that does not use spoofing occurs, ingress filtering allows the origin of the attack to be determined simply by examining the source addresses of attack packets. Therefore, ingress filtering can speed up recovery from such attacks. Disadvantageously, the IETF's recommendations need to be adopted by many parties (networks unwittingly used in smurf attacks and ISPs) that are thereby burdened with new responsibilities and costs, but receive no compensation for solving what they may consider somebody else's (the e-merchants') problem. Moreover, these recommendations do not deter all possible congestive denial of service attacks. Even without spoofing and directed broadcast, attackers can use agents to obtain the cloaking and leverage necessary for successful attacks. Therefore, adoption of these recommendations (particularly ingress filtering) has not been widespread.

IP traceback is a recently proposed alternative to ingress filtering (see, e.g., S. Savage, D. Wetherall, A. Karlin and T. Anderson, "Practical Network Support for IP Traceback," *Proc. SIGCOMM'2000*, pp. 295–306, ACM, Stockholm, Sweden, August 2000). Unlike ingress filtering, IP traceback can be effective even if not widely deployed. IP traceback modifies routers so that they probabilistically send traceback information to a packet's destination. Statistical methods allow a victim to use such information to partly reconstruct the attack path (the reconstructed part is that closest to the victim). However, IP traceback has weaknesses that may deleteriously affect the likelihood of its adoption. It appears that attackers can easily defeat IP traceback by making attacks oblique, i.e., by ostensibly targeting neighbors of the victim, rather than the victim itself. Moreover, traceback information sent by routers that are further from the victim than is the closest attacker can be spoofed and therefore needs authentication. The infrastructure necessary for such authentication may add considerable complexity and vulnerabilities of its own. Finally, like ingress filtering, traceback does not stop attackers from using agents, and may increase ISP responsibilities and costs without contributing to ISP revenues.

Victims can often restore their Internet connectivity by simply changing their address in case of an attack. Of course, this solution is not robust against attackers that periodically check the victim's address via the current DNS mapping. A more general solution against congestive denial of service attacks consists in combining input logging and rate limiting (see, e.g., "Characterizing and Tracing Packet Floods Using Cisco Routers,"Cisco, available on their website on the worldwide web (www), cisco.com, at /warn/public/707/22.html). To use these techniques, the victim must initially determine the signature of the attack, i.e., how the attack packets differ from legitimate packets. ISP personnel then install a filter matching the attack's signature in the egress port of the router closest to the victim. The filter generates a log that reveals what ingress port the attack is coming from. Input logging is then iterated for the next upstream router, until the router closest to the origin of the attack is found. A rate-limiting filter matching the attack's signature is then left installed in the ingress port from where the attack is coming.

Input logging and rate limiting have many limitations. First, attackers may perform an oblique attack noted above, i.e. obfuscate the attack by ostensibly targeting a neighbor of the intended victim. Thus, the victim may not have the opportunity to examine attack packets. Second, even if attack packets reach the victim, the signature may be difficult to characterize. For example, an attacker may coordinate agents so that they send endless streams of seemingly legitimate but fruitless requests to the victim, so as to crowd out requests from legitimate clients. Unlike smurf and TCP SYN flooding attacks, such crowding attacks do not cause easily identifiable anomalies at the network or transport layer, and therefore may be difficult to filter in routers. Third, filtering, logging, and rate limiting may not be available or may prohibitively slow down many routers, especially in the network core. Fourth, rate limiting may be unable to distinguish malicious and legitimate packets (e.g., TCP SYN packets) that arrive in the same ingress port. Thus, rate limiting may be ineffective if the attack is evenly distributed among ingress ports. Finally, input logging and rate limiting are often labor-intensive, tedious procedures performed under pressure and usually without adequate compensation to the ISP.

Although the aforenoted co-pending application entitled: "Method and Apparatus For Protecting Electronic Commerce From Distributed Denial-of-Service Attacks", solves many of these problems for e-commerce applications, a methodology is needed that automatically limits the effects of a broad classes of denial of service attacks on sites that have a different business model, for example, advertising, subscription-based, or non-profit sites.

SUMMARY OF THE INVENTION

In accordance with the server profile enforcement (SPE) methodology of the present invention, an Internet-connected site that desires protection against denial of service attacks provides to an ISP a profile of the site's legitimate client traffic. The profile may indicate, for example, what protocols are allowed, and, for each such protocol, what destination port numbers or message types are allowed, maximum transmission rate, maximum number of connections, and whether conformance to congestion-avoidance rules should be enforced. Additionally, a profile may specify that packets that do not conform to the profile be dropped, marked for preferential dropping, or carried in a specific class of service. The ISP filters packets arriving on its access links and destined to the site according to the site's profile. Such a site is referred to as an SPE subscriber and, for this service, the ISP may receive from it fees or other compensation.

To provide SPE service, an ISP deploys devices designated as SPE units, typically implemented in the ISP's access gateways. Alternatively, SPE units can be implemented in IP service switches or as stand-alone devices. An ISP installs in its SPE units the profiles of the SPE subscribers. The SPE units perform ingress filtering, previously described, to determine whether the source address of a packet arriving on an access link is properly associated with the port on which the packet has arrived. Spoofed packets are thus immediately filtered before entering the Internet. Additionally, the SPE units filter packets destined or belonging to a connection to an SPE subscriber. Thus, denial of service attacks and other traffic that does not conform to SPE subscribers' profiles is dropped, marked for preferential dropping, or segregated in a specific class of service before entering the Internet.

SPE service can be deployed using one or more best-effort classes of service. In the current Internet, such multiple classes of service could be implemented using, for example, what has been designated as diffserv (see, e.g., S. Blake, D. Black, M. Carlson, E. Davies, Z. Wang and W. Weiss, "An Architecture for Differentiated Services," IETF, RFC 2475, December 1998). In one such embodiment, traffic is carried in one of four classes of service. Three such classes are used for carrying traffic from ISPs that is ingress filtered and is either a) TCP-friendly traffic; traffic whose source or destination is a subscribing site and that obeys the site's profile and TCP congestion avoidance rules, as verified by SPE units; or b) profile-filtered traffic; traffic whose destination is a subscribing site and that obeys the site's profile, but not TCP congestion-avoidance rules, as verified by SPE units; or c) source-filtered traffic; traffic whose source or destination is not a subscribing site, but is ingress filtered. A fourth class of service, called spoofable, is used to carry traffic arriving from ISPs that do not support ingress filtering. In alternate embodiments, the profile-filtered class of service may be merged into the source-filtered class of service, the source-filtered class of service may be merged into the spoofable class of service, or the profile-filtered, source-filtered, and spoofable classes of service may be merged into a single class of service, or all classes of service may be merged into a single class of service. Embodiments with a greater number of classes of service are effective against a greater range of attacks. Embodiments with two or more classes of service are effective even if deployed only by select ISPs. The embodiment with a single class of service is most effective if universally deployed.

DETAILED DESCRIPTION

Figure 1:
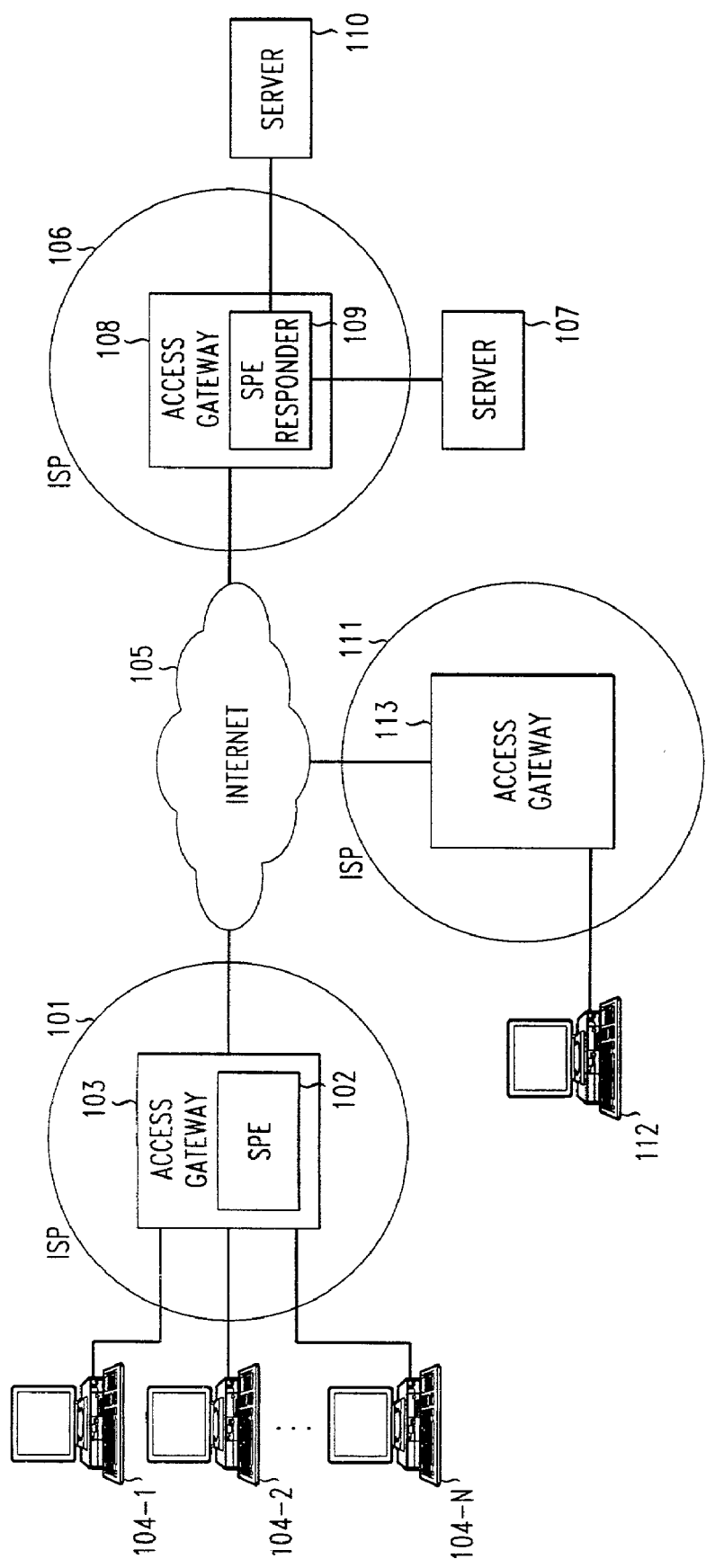
FIG. 1 is a block diagram of a system which used a single class of service for carrying traffic and in which SPE units are incorporated in ISP access gateways.

With reference to FIG. 1, ISP 101, which supports the SPE service, incorporates an SPE unit 102 into its access gateway 103. Although only a single access gateway 103 is shown in FIG. 1, it should be appreciated that an ISP will have at least one such access gateway associated with each of its likely multiple points of presence (PoPs). A plurality of clients 104-1–104-N are shown connected over access links to access gateway 102. The access links connecting the clients and the access gateways can be over any telecommunications network such as a POTS network or a DSL connection, a cable network using a cable modem, or any other network or methodology, wired or wireless, which provides Internet connectivity to the clients.

Traffic between a client 104 and a server 107 is carried between ISP 101 and the Internet 105, and between the Internet 105 and the ISP 106 to which the server 107 is connected. Server 107, a subscribing site of the SPE service, is connected over an access link to ISP 106 through an access gateway 108, which includes an SPE responder 109, to be described later. Other non-subscribing sites, such as server 110 may be connected to the same access gateway 108, or to other PoPs of ISP 106 that are not shown in FIG. 1. Other ISPs, which do not support SPE service, such as ISP 111 are connected to the Internet 105. A client customer connected to ISP 111, such as client 112, may access either server 107 or server 110, or any other server connected on the Internet, through the access gateway 113.

For providing the filtering service for a server site, the ISP receives from the subscribing server site remuneration of some type, monetary or otherwise.

The server 107 that desires to initiate SPE service with ISP 101 provides to that ISP a profile that characterizes the server's legitimate client traffic. This profile is stored by ISP 101 in SPE unit 102 in access gateway 103. Each access router in ISP 101 includes a similar SPE unit. SPE unit 102 monitors packets coming in from clients 104 and drops those packets that do not conform to the packet's destination's profile, if such profile exists. The profile indicates such information, for example, as what protocols are allowed by the server, and, for each such protocol, what destination port numbers or message types are allowed, a maximum transmission rate, and, for connection-oriented protocols, such as TCP/IP, the maximum number of allowed connections between a packet source and destination, and whether to enforce congestion avoidance. For the latter, the server profile will also indicate an ISP identifier and a secret key, for use as will be described below. The profile may specify that nonconforming packets be dropped or, if the network supports such a notion, marked for preferential dropping in case of congestion.

The SPE unit 102 also incorporates the functions of ingress filtering. As previously described, ingress filtering determines whether the source address of a packet from a client is properly associated with the port on which the packet has arrived. If it is not properly associated, the packet is dropped.

The ISP 101 may also use the SPE unit 102 to constrain the traffic is accepts from its clients 104, regardless of destination. Such constraints are specified in a default profile and seek to protect the ISP's links and routers from malicious congestion. An ISP may install in an SPE unit at most one default profile.

Figure 2:
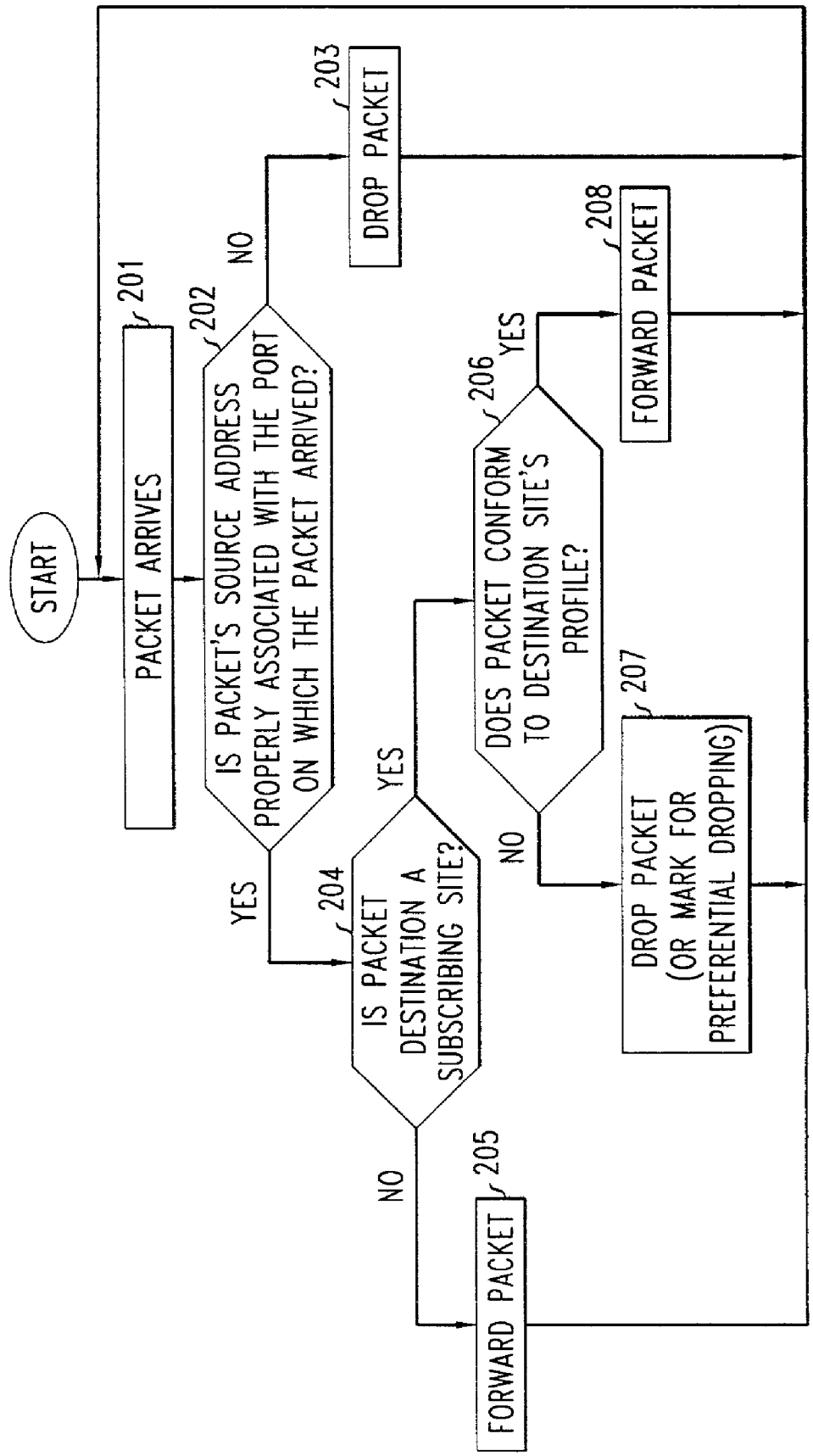
FIG. 2 is a flowchart showing the steps performed by an SPE unit in the system of FIG. 1.

The flowchart of FIG. 2 illustrates the operations performed by an SPE unit when a packet arrives from an access link. At step 201, a packet arrives from an access link. At step 202, a determination is made whether the source address of the packet is properly associated with the port on which it arrived. If it is not properly associated, then, at step 203, the packet is dropped. If it is properly associated, then, at step 204, a determination is made whether the destination of the packet is a subscribing site. If it is not a subscribing site, then, at step 205, the packet is forwarded. If the destination is a subscribing site, then, at step 206, a determination is made whether the packet conforms to the destination site's profile. If it does not, then, at step 207, the packet is dropped (or marked for preferential dropping depending upon the profile and the capabilities of the network). If it does conform, then, at step 208 the packet is forwarded. Although, as described above, the step of ingress filtering of step 202 is show being performed before the steps associated with determining whether a packet conforms to its destination site's profile, it should be recognized by one skilled in the art that the order in which these sub-processes are performed is immaterial and can be reversed.

Enforcement of TCP congestion-avoidance prevents a malicious client from flooding the network or a server with TCP packets. Unlike limiting the transmission rate to some predetermined value, enforcement of congestion-avoidance provides dynamic and scalable throttling of each client's packets.

A difficulty for enforcing congestion-avoidance is that while ingress filtering is not universally adopted, attackers can spoof acknowledgements. In a possible scenario, a first attack agent sends to a second attack agent acknowledgements with the source IP address spoofed with the victim's IP address. Obeying to such acknowledgments, an SPE unit could allow the second attack agent to flood the victim with non-SYN TCP segments.

To avoid spoofed acknowledgements in this first embodiment of the invention, SPE units employ a challenge-response authentication protocol. When the SPE unit 102 forwards the initial (SYN) TCP segment from a client 104 to a server 107 that desires enforcement of congestion-avoidance, then the SPE unit inserts in the segment, as TCP options, the ISP identifier of ISP 101, (found in the server's profile) and a challenge. The challenge is a non-repeating cryptographically secure random number preferably of the same length as the ISP secret key in the server's profile. Upon receiving such a segment, server 107 verifies that the server indeed has requested enforcement of congestion-avoidance by the ISP and that the segment's source IP address is indeed within that ISP 101. The server then generates a response, computed using a one-way hash function, with the challenge and the ISP secret key as arguments. Thereafter, the server includes the response as a TCP option in all segments sent back to the client 104. The SPE unit 102 checks and clears this TCP option before forwarding a segment to the client 104. If the TCP segment does not contain the correct response, SPE unit 102 drops the segment; otherwise, SPE unit 102 notes the TCP header's feedback, clears the response TCP option, and forwards the segment to the client 104.

This challenge-response protocol assumes that an ISP's SPE units and links and routers between the SPE units and a subscribing server, and the server itself, are not compromised. In such circumstances, attackers are unable to observe the challenge sent by an SPE unit or the response sent by the server. An attacker may spoof a challenge, but the server will verify that its source address is within an ISP that supports ingress filtering and enforcement of congestion-avoidance. Therefore, the attacker will be unable to observe the response to a spoofed challenge.

The response length should preferably be large enough to discourage attackers from trying to defeat feedback enforcement by sending to the client spoofed feedback packets with guessed responses. A response length of six bytes is probabilistically sufficient, and adds only eight bytes to each segment sent by the server (two bytes being necessary for the option type and length). For a given response length, security can be increased by having the SPE unit more frequently generate a new challenge and expect a new response. Security can be further increased by periodically changing the secret key used by the ISP and the server.

The profile provided to an ISP by a subscribing server will define acceptable packet traffic characteristics. As an example, the profile of a server might: a) allow only packets using the TCP protocol and destination port 80; b) limit the number of TCP connections; and c) activate the enforcement of congestion-avoidance. Such a profile would cause the SPE unit to drop ICMP, UDP, and TCP SYN flood packets, thereby protecting the server from the currently most popular denial of service attacks. This profile would also already protect the server against many denial of service attacks that may become popular in the future, such as attacks using non-SYN TCP packets.

SPE assumes that mutually authenticated and encrypted channels are used for communication between a server and an ISP and between an ISP and its SPE units. Such channels can be implemented, for example, using the Transport Layer Security (TLS) protocol.

As described above, the SPE unit 102 is implemented in the access gateway 103 of ISP 101, which can easily associate incoming packets with the respective ISP client. Accordingly, this is a preferable location to implement the SPE unit, which needs to measure and enforce transmission rates and number of connections per ISP client 104.

Access architectures that are asymmetric, such as those that route packets to and from a client over different paths, require specific considerations for SPE unit installation. For example, some ISPs provide to each customer a fast unidirectional satellite or cable downlink and a slower telephone uplink. In such cases, depending on where an SPE unit is installed, it may be unable to observe the server's acknowledgements. Therefore, in asymmetric access architectures, an SPE unit must be installed either at a receive-capable feed, such as at a router connected both to customer downlinks and uplinks, or downstream from such feeds, i.e., further away from customers.

If an SPE unit is not implemented in an access gateway, then the latter should preferably incorporate ingress filtering, so as to limit IP address spoofing and enable accurate downstream measurements per ISP client.

As described above, enforcement of congestion-avoidance requires changing the server's operating system to implement the server-side challenge/response protocol. Changing the operating system may in some cases be undesirable or impossible. A more practical alternative may be to implement the protocol upstream from the server, such as in a customer-premises router, or ISP services switch or access gateway. As an example of this last alternative, SPE responder 109 is implemented in the access gateway 108 used by server 107 to perform the server-side challenge/response protocol functions. For this case, server 107 uses a smaller maximum transmission unit (MTU), leaving room for insertion of the response option in transmitted packets.

SPE service offers several advantages relative to ingress filtering and rate limiting, the techniques that, as previously described, are currently typically used in cases of denial of service attacks. First, SPE may be used preventively, eliminating server downtime, unlike input logging which is reactive, being used only when losses are already occurring. Second, SPE does not require the signature of an attack to be known. A server only needs to provide a characterization of its legitimate traffic in a profile. Third, SPE may work even when attack packets are difficult to distinguish from legitimate packets. For example, SPE can prevent attackers from flooding a Web server using TCP packets that ignore the congestion-avoidance rules. Fourth, SPE uses SPE units installed at the network edge and does not modify the network core. Thus, SPE (1) does not slow down core routers; (2) provides fine-grained filtering at the level of each ISP customer; and, in particular, (3) allows client packets of certain types to be denied access (e.g., ICMP) without affecting the server's ability to use similar packets to communicate with nodes within the ISP using, for example, various diagnostic tools. Finally, SPE is an automated service for which the ISP is compensated.

The previously described embodiment is most effective when it is universally deployed. Disadvantageously, however, the described embodiment will not thwart denial of service attacks that are launched through ISPs that do not support SPE service. Thus, for example, an attack against server 107 launched by a client 112 that is connected to the Internet 105 through ISP 111 that doesn't support SPE service, will not be filtered by access gateway 113, and may succeed. Also, oblique attacks may be able to achieve denial of service against server 107. An oblique attack against server can be successful by targeting a neighbor of server 107 such that routes between attack agents and such a neighbor of server 107 share links with routes between legitimate clients of server 107 and server 107. An oblique attack against neighbor server 110 to server 107, for example, launched by an agent through ISP 111, which doesn't support SPE service, may cause denial of service to server 107. Also, if neighbor server 110 is not a subscriber to the SPE service through ISP 101, which does support SPE service, an agent connected to ISP 101 may also be able to launch a successful oblique attack that will effect denial of service to server 107, which could not have been effected directly against server 107 by that same client.

An alternative embodiment that is more successful in preventing frontal attacks against a server from agents that access the Internet via service providers that do not support SPE service, and against oblique attacks, assumes Internet support for multiple classes of service. In the current Internet, these multiple classes of service could be implemented using, for example, the aforenoted and referenced diffserv.

Other implementations could use integrated services (intserv) (see, e.g., R. Braden, D. Clark, S. Shenker, "Integrated Services in the Internet Architecture: an Overview," IETF, RFC 1633, June 1994), or any other quality of service scheme. Most currently available routers support at least one such scheme. A packet's class of service may be marked, for example, in the TOS (type of service) field of the the packet's IP header.

Figure 3:
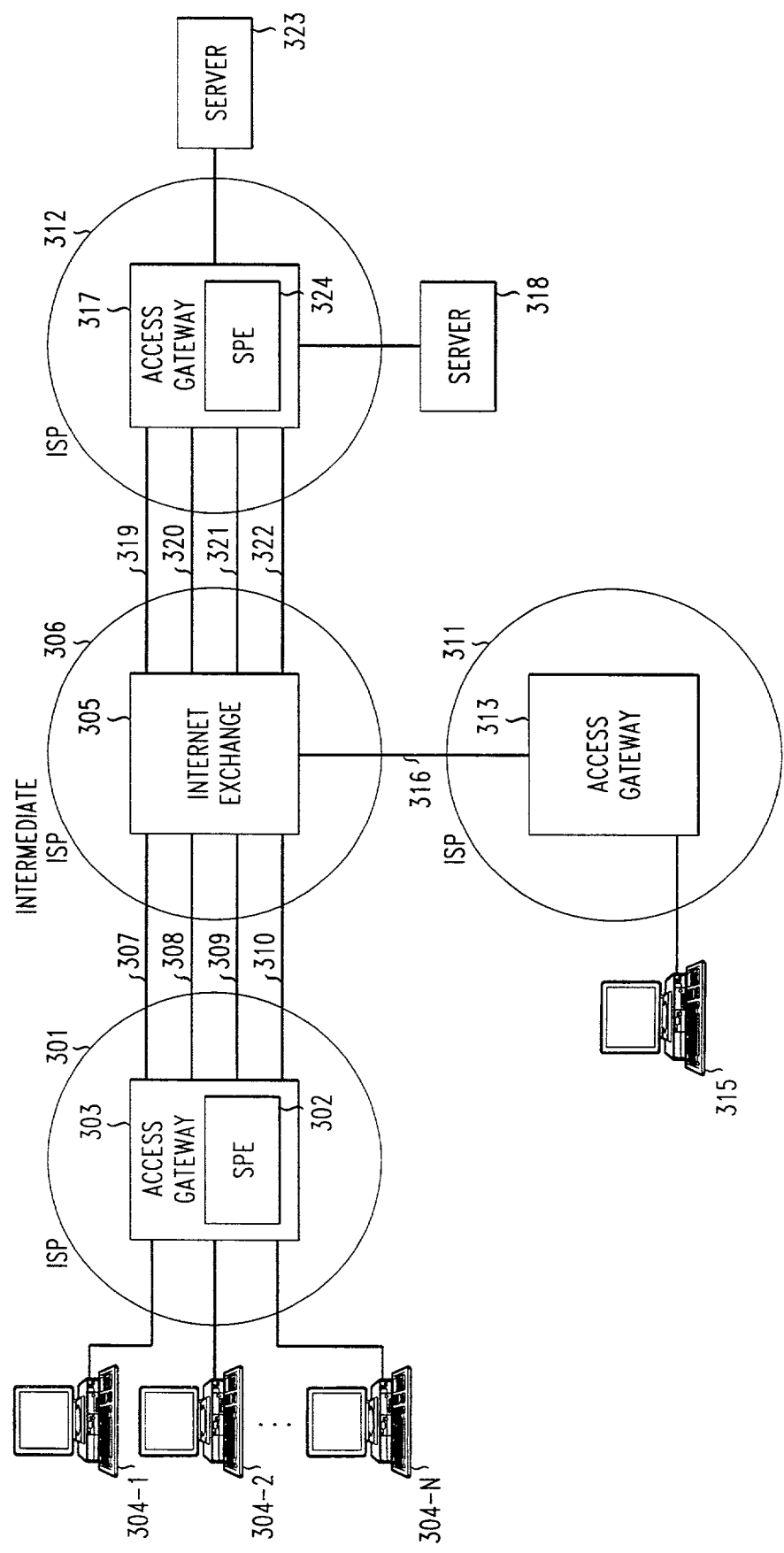
FIG. 3 is block diagram of system incorporating a second embodiment of the invention, which uses multiple classes of service for carrying traffic.

The architecture of this embodiment is shown in FIG. 3. In FIG. 3, ISP 301 supports SPE service. An SPE unit 302 is incorporated within access gateway 303. Clients 304-1–304-N are connected to the input ports of access gateway 303 over access links. As will be described best-effort traffic within and between ISPs that support SPE is divided into four different classes of service. To illustrate that packets can be carried in four different classes of service, ISP 301 and Internet exchange 305 within an intermediate ISP 306 are shown interconnected by four connections, 307, 308, 309 and 310, for the separate transmission of packets in each of the four classes of service.

At Internet exchange 305, two or more ISPs exchange packets. Two other ISPs are shown connected to Internet exchange 305: ISP 311 and ISP 312. ISP 311 does not support SPE service and is shown including an exemplary access gateway 313 to which one or more clients 315 are connected over access links. Since ISP 311 does not support SPE service, it uses a best-effort class of for the transport of packets to and from Internet exchange 305. Thus, for illustrative purposes, only a single connection 316 is shown interconnecting ISP 310 and Internet exchange 305. ISP 312 supports SPE service, and includes access gateway 317 to which server 318, a subscriber of the SPE service is connected over an access link. Separate connections 319, 320, 321 and 322, for the four classes of service are shown interconnecting Internet exchange 305 and ISP 312. Server 323, which is not a subscriber of SPE service with ISP 301 is also shown connected to access gateway 317.

As previously described, SPE unit 302 provides ingress filtering of all packets from any client 304 destined to any site, whether a subscribing site or not. For packets destined to a subscribing site, such as server 318, SPE unit 302 also provides filtering of packets in accordance with that server's stored profile. Packets originating from one of the clients 304 are carried in one of three different classes of service. A first class of service is used for carrying TCP-friendly traffic; traffic whose source or destination is an SPE subscribing site and that obeys the site's profile and TCP congestion-avoidance rules, as verified by SPE units 302 and 324, the latter being the SPE unit associated with access gateway 317 to which server 318 is connected. (Packets using any other connection-oriented protocol that incorporates congestion-avoidance rules similar to those of TCP would also be carried in this class of service.) The second class of service is used for carrying profile-filtered traffic; traffic whose destination is a SPE subscribing site and that obeys the site's profile, as verified by SPE units, but possibly does not obey TCP's congestion-avoidance rules (for example, if the protocol used is UDP or ICMP). The third class of service is used for carrying source-filtered traffic; traffic that has been ingress filtered but does not qualify for neither the TCP-friendly nor profile-filtered classes of service (for example, the source and the destination are not SPE subscribers). The fourth class of service is used for carrying best-effort traffic that is not ingress filtered (for example, arriving from clients that access the Internet via service providers that do not support ingress filtering). This class is designated as spoofable since a packet's source address cannot be trusted.

When a packet arrives at Internet exchange 305 from ISP 301, which does support SPE, it is forwarded in the class in which it is already marked. Thus, for example, a packet destined to subscribing server 318 and arriving in the TCP-friendly class of service from ISP 301 from client 304-1, which is using the TCP protocol, is forwarded by Internet exchange 305 in that same TCP-friendly class to ISP 312. A packet destined to subscribing server 318 and arriving in the profile-filtered class of service from ISP 301 from client 304-2, which is using the ICMP protocol, is forwarded by Internet exchange 305 in that same profile-filtered class to ISP 312. A packet destined to a non-subscribing server 323 and arriving in the source-filtered class of service from ISP 301 from client 304-N, which uses any protocol, is forwarded by Internet exchange 305 in that same source-filtered class. If a packet arrives at Internet exchange 305 from an ISP that doesn't support SPE service, it is forwarded in the spoofable class of service no matter in what class it arrives. Thus, a packet destined to either subscribing server 318 or non-subscribing server 323 and arriving from ISP 311, which doesn't support SPE service and doesn't perform ingress filtering, is forwarded to ISP 312 in the spoofable class of service.

In this embodiment, a challenge-response is not necessary to authenticate acknowledgements from a subscribing site since an SPE unit can authenticate an acknowledgement simply by verifying that it does not use the spoofable class of service. Thus, SPE unit 302 can verify acknowledgements from server 318 by verifying that they are not marked and received in this fourth class of service.

The four classes of service are ranked in the following descending rank order: TCP-friendly, profile-filtered, source-filtered, and spoofable, where load on a lower-ranked class of service can have at most limited effect on performance for traffic carried in a higher-ranked class of service. These different classes of service can be implemented on shared physical resources using standard scheduling mechanisms, such as priority-based or waited fair queueing. A higher ranked class of service may have a higher priority for use of network resource than a lower ranked class of service or, alternatively, each class of service may have a proportional share of network resources.

Enforcement of congestion avoidance rules automatically rids the TCP-friendly class from most congestive denial of service attacks. Other automatic filtering according to a site's profile makes attacks difficult to mount in the profile-filtered class. The source-filtered class allows attacks that do not use spoofing but speeds up manual reaction to such attacks, because the attack origin is found by simply examining the source address of the attack packets. The spoofable class does not help mitigate attacks, but allows SPE service to be deployed incrementally since attacks in this class of service will have limited effect on the traffic being carried in the three higher-ranked classes of service.

If only three classes of service are available, the profile-filtered class of service may be merged into the source-filtered class of service, or the source filtered class of service may be merged into the spoofable class of service. If only two classes of service are available, then the profile-filtered class of service, the source-filtered class of service, and the spoofable class of service may be merged together into a single class of service.

Figure 4:
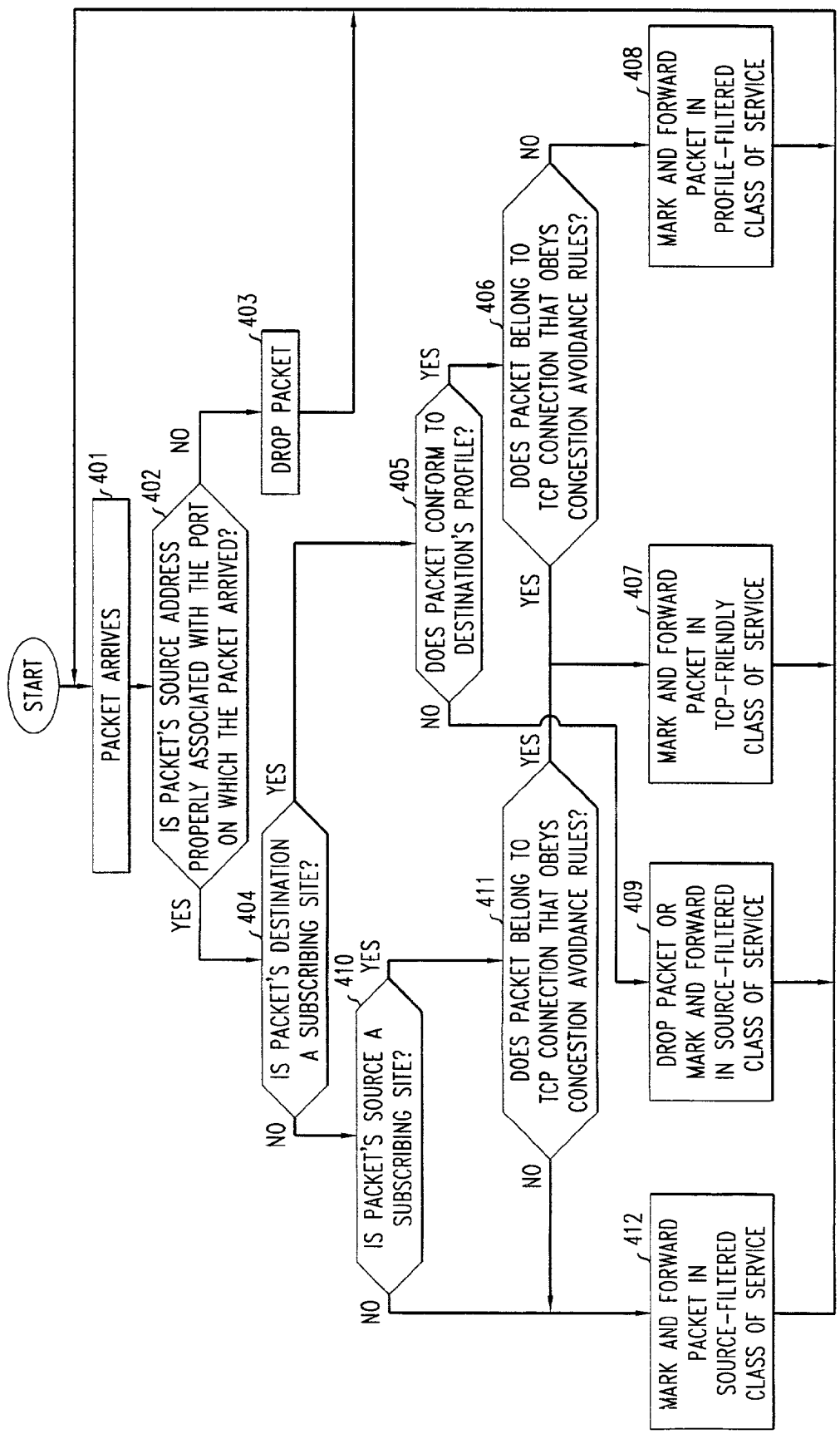
FIG. 4 is a flowchart showing the steps performed by an SPE unit in the system of FIG. 3.

The flowchart in FIG. 4 details the steps performed by an SPE unit in the system of FIG. 3. At step 401, a packet arrives. Since the SPE unit performs ingress filtering, at step 401, a determination is made whether the packet's source address is properly associated with the port on which the packed has arrived. If it isn't properly associated, then, at step 403, the packet is dropped. If it is properly associated, a determination is made, at step 404, whether the packet's destination is a subscribing site to SPE service. If it is a subscribing site, then, at step 405, a determination is made whether the packet conforms to its destination's profile. If it does conform, then, at step 406, a determination is made whether the packet belongs to a TCP connection (or other similar connection-oriented protocol) that obeys congestion-avoidance rules. If it does belong, then, at step 407, the packet is marked and forwarded in the TCP-friendly class of service. If the packet doesn't belong to a TCP connection (or other similar connection-oriented protocol), that obeys congestion-avoidance rules but does conform to its destination's profile, then, at step 408, the packet is marked and forwarded in the profile-friendly class of service. If, at step 405, the packet doesn't conform to its destination profile, then, at step 409, the packet, depending upon the profile, is either dropped or marked and forwarded in the source-filtered class of service. If, at step 404, the packet's destination is determined not to be a subscribing site, then, at step 410, a determination is made whether the packet's source is a subscribing site. If the packet's source is a subscribing site, then, at step 411, a determination is made whether the packet belongs to a TCP connection (or other similar connection-oriented protocol) that obeys congestion-avoidance rules. If it does, then, at step 407, the packet is marked and forwarded in the TCP-friendly class of service. If it doesn't belong to a TCP connection (or other similar connection-oriented protocol), that obeys congestion-avoidance rules, then, at step 412, the packet is marked and forwarded in the source-filtered class of service. If, at step 410, it is determined that neither the packet's destination nor the packet's source is a subscribing site, then, at step 409, the packet is marked and forwarded in the source-filtered class of service.

Figure 5:
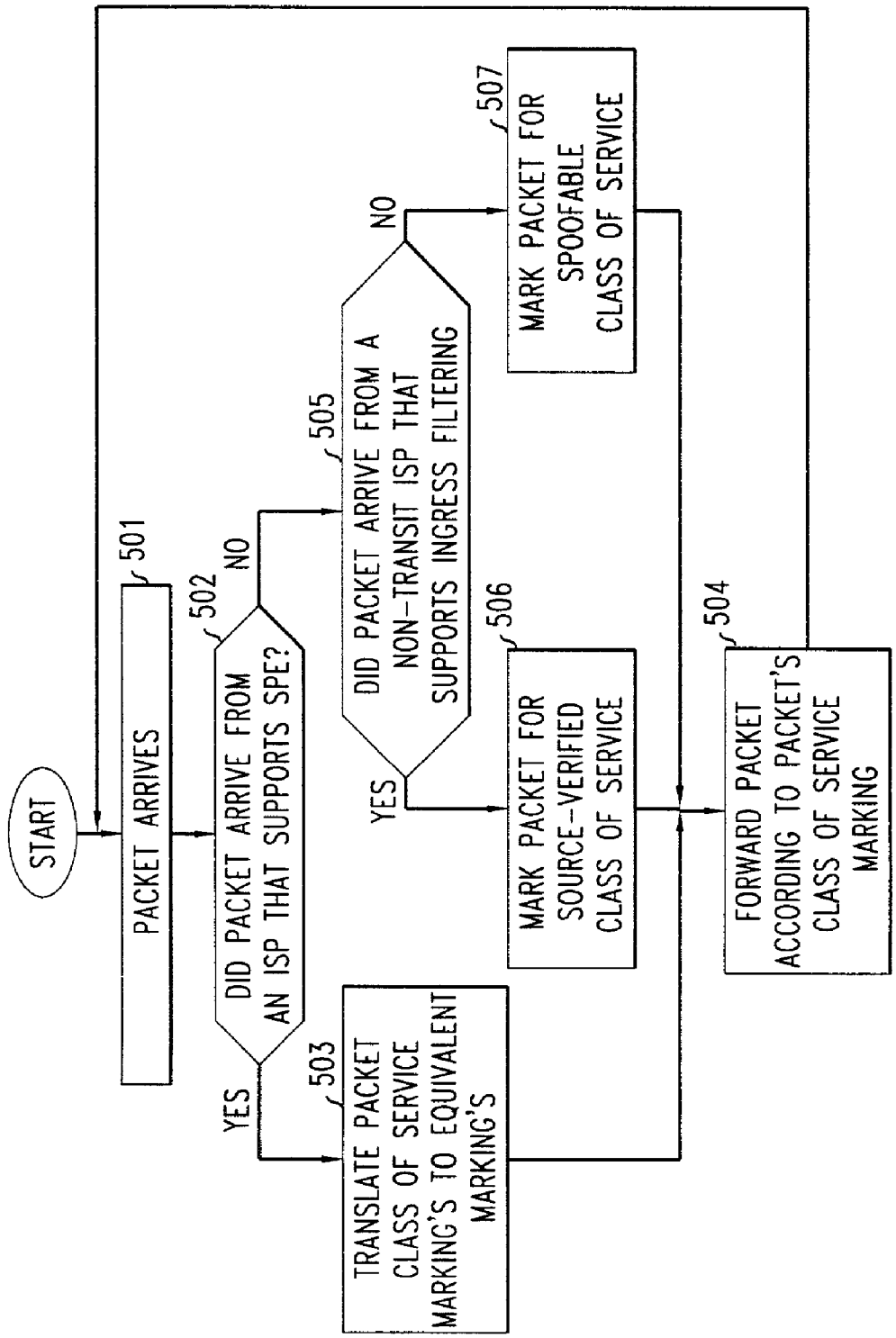
FIG. 5 is a flowchart showing the steps performed by a border router at a peering point at which two ISPs exchange packets.

The flowchart of FIG. 5 details the steps performed by a border router within an ISP that connects to a different ISP either directly through a peering point or through an Internet exchange. At step 501, a packet arrives. At step 502, a determination is made whether the packed arrived from an ISP that supports SPE service. If it did arrive from an ISP that supports SPE service, then, at step 503, the packet's class of service marking is translated to an equivalent marking for the ISP into which the packet is being transferred. At step 504, the packet is then forwarded according to the packet's translated class of service marking. If, at step 502, it is determined that the packet arrived from an ISP that doesn't support SPE service, then, at step 505, a determination is made whether the packet arrived from a non-transit ISP that supports ingress filtering. If it did, then, at step 506, the packet is marked for the source-verified class of service and, at step 504, forwarded according to this class of service marking. If, at step 505, it is determined that the packet arrived from a non-transit ISP that does not support ingress filtering, then, at step 507, the packet is marked for the spoofable class of service and, at step 504, forwarded according to this class of service marking.

As previously noted, the present invention is likely to be implemented, in part, as one or more computer programs or applications running in the periphery of the Internet, most probably in an access gateway. As noted, however, it may also be implemented, in part, in a computer program or application running at downstream from an access gateway.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

The invention claimed is:

1. A method of preventing denial of service attacks against a subscribing site, the method comprising:
   at or near a point of ingress of a packet into the Internet, determining whether a packet's destination is the subscribing site or the packet belongs to a connection to the subscribing site, the subscribing site being a site whose connections the point of ingress has agreed to monitor for conformance to congestion avoidance rules that limit a packet sender's transmission rate according to dynamic route properties;
   verifying whether the packet belongs to a connection that conforms to such congestion avoidance rules; and
   when the packet's destination is determined to be the subscribing site or is determined to belong to a connection to the subscribing site, and the packet is verified as belonging to a connection that conforms to such congestion avoidance rules and that the number of connections between the packet's source and destination is below a maximum allowed by the subscribing site, marking the packet for forwarding in a first of service that is distinct from any other class of service used for forwarding other packets; and
   when the packet does not qualify for the first class of service, marking the packet for forwarding in one of one or more classes of service that are different than the first class of service.

2. The method of claim 1 wherein the method is performed by an Internet Service Provider (ISP) and the subscribing site remunerates the ISP for performing the method on packets destined to it.

3. The method of claim 1 further comprising:
   marking for forwarding a packet in a second class of service when the packet does not qualify for the first class of service but is destined to the subscribing site and is verified as conforming to such congestion avoidance rules; and
   marking for forwarding a packet in a third class of service when the packet does not qualify for the first or second classes of service.

4. The method of claim 3 wherein the first, second, and third classes of service are ranked from highest to lowest in this order such that load on a given class of service has limited effect on the performance of packets sent in higher ranked classes of service.

5. The method of claim 4 wherein a higher ranked class of service has a higher priority for use of network resources than does a lower ranked class of service.

6. The method of claim 4 wherein each of class of service has a proportional share of network resources.

7. A computer readable media tangibly embodying a program of instructions executable by a computer to perform a method at or near a point of ingress of a packet into the Internet that protects against denial of service attacks against a subscribing site, the method comprising the steps of:

determining whether the packet's destination is the subscribing site or the packet belongs to a connection to the subscribing site, the subscribing site being a site whose connections the point of ingress has agreed to monitor for conformance to congestion avoidance rules that limit a packet sender's transmission rate according to dynamic route properties;

verifying whether the packet belongs to a connection that conforms to such congestion avoidance rules; and when the packet's destination is determined to be the subscribing site or is determined to belong to a connection to the subscribing site, and the packet is verified as belonging to a connection that conforms to such congestion avoidance rules and that the number of connections between the packet's source and destination is below a maximum allowed by the subscribing site, marking the packet for forwarding in first class of service that is distinct from any other class of service used for forwarding other packets; and when the packet does not qualify for the first class of service, marking the packet for forwarding in one of one or more classes of service that are different than the first class of service.

\* \* \* \* \*